(12) United States Patent
Matsumoto et al.

(10) Patent No.: US 9,227,370 B2
(45) Date of Patent: Jan. 5, 2016

(54) METHOD OF MANUFACTURING CONTINUOUS FASTENER ELEMENT

(71) Applicant: YKK Corporation, Tokyo (JP)

(72) Inventors: Satoshi Matsumoto, Tapei (TW); Chi-yuan Huang, Tapei (TW)

(73) Assignee: YKK Corporation (JP)

( * ) Notice: Subject to any disclaimer, the term of this patent is extended or adjusted under 35 U.S.C. 154(b) by 78 days.

(21) Appl. No.: 14/134,068

(22) Filed: Dec. 19, 2013

(65) Prior Publication Data

US 2014/0103569 A1 Apr. 17, 2014

Related U.S. Application Data

(62) Division of application No. 13/142,890, filed as application No. PCT/JP2009/056336 on Mar. 27, 2009, now Pat. No. 8,765,248.

(51) Int. Cl.
*D02J 3/02* (2006.01)
*B29C 59/02* (2006.01)
*B29C 59/04* (2006.01)
*D01D 5/22* (2006.01)
(Continued)

(52) U.S. Cl.
CPC . *B29D 5/04* (2013.01); *A44B 19/12* (2013.01); *B29D 5/06* (2013.01); *Y10T 428/24* (2015.01); *Y10T 428/24008* (2015.01)

(58) Field of Classification Search
CPC .......... B29C 59/02; B29C 59/04; B29D 5/04; B29D 5/06; D01D 5/22; D02G 1/14; D02G 3/34; D02J 3/02

USPC ................. 264/162, 168, 210.1, 210.2, 210.8, 264/211.12, 281
See application file for complete search history.

(56) References Cited

U.S. PATENT DOCUMENTS 3,140,526 A * 7/1964 Tlamicha ........................ 451/54
4,306,410 A * 12/1981 Nakamura et al. .............. 57/234
(Continued)

FOREIGN PATENT DOCUMENTS

DE 2902660 A 8/1979
DE 3577510 6/1990
(Continued)

OTHER PUBLICATIONS

International Search Report and Written Opinion, PCT International Patent Application No. PCT/JP2009/056336, mailed Jun. 30, 2009.

*Primary Examiner* — Leo B Tentoni
(74) *Attorney, Agent, or Firm* — Kilpatrick Townsend & Stockton LLP

(57) ABSTRACT

A continuous fastener element including: a coupling head; upper and lower leg portions; and a connecting portion wherein surfaces of the coupling head, the leg portions, and the connecting portion are each formed as a rough surface with a plurality of recesses. Furthermore, a head surface of the coupling head of the continuous fastener element is formed to have an average roughness Ra smaller than that of outer peripheral surfaces of the leg portions. Accordingly, gloss and luster of the continuous fastener element may be easily reduced or removed. Furthermore, when the slide fastener is formed, the resistance between the coupling heads of the left and right continuous fastener elements may be made small and the left and right element rows may smoothly engage with each other or disengage from each other.

6 Claims, 5 Drawing Sheets

(51) Int. Cl.
  *D02G 1/14*    (2006.01)
  *D02G 3/34*    (2006.01)
  *B29D 5/04*    (2006.01)
  *A44B 19/12*   (2006.01)
  *B29D 5/06*    (2006.01)

(56) References Cited

U.S. PATENT DOCUMENTS

| | | | |
|---|---|---|---|
| 4,319,387 A | | 3/1982 | Yoshida |
| 4,333,903 A | | 6/1982 | Yoshida et al. |
| 4,604,774 A | | 8/1986 | Yamaguchi et al. |
| 5,254,194 A | * | 10/1993 | Ott et al. ................ 156/176 |
| 6,302,676 B1 | | 10/2001 | Kato et al. |
| 2001/0004787 A1 | | 6/2001 | Nagata et al. |
| 2007/0016251 A1 | * | 1/2007 | Roby ........................ 606/228 |

FOREIGN PATENT DOCUMENTS

| | | |
|---|---|---|
| DE | 60030831 T2 | 1/2007 |
| EP | 0153691 A2 | 9/1985 |
| EP | 1112700 A | 7/2001 |
| FR | 2415980 A | 8/1979 |
| GB | 2015413 A | 9/1979 |
| GB | 2155098 A | 9/1985 |
| JP | 50-31133 | 9/1975 |
| JP | 54-102376 A | 8/1979 |
| JP | 60-179004 A | 9/1985 |
| JP | 1-19888 | 4/1989 |
| JP | 7-63411 A | 7/1995 |
| JP | 7-284404 A | 10/1995 |
| JP | 2001-178508 A | 7/2001 |
| JP | 2005-160667 A | 6/2005 |
| JP | 3698562 B2 | 9/2005 |
| TW | 328839 | 3/2008 |

* cited by examiner

METHOD OF MANUFACTURING CONTINUOUS FASTENER ELEMENT

This application is a divisional of U.S. application Ser. No. 13/142,890, which issued as U.S. Pat. No. 8,765,248 on Jul. 1, 2014, and which is a national stage application of PCT/JP2009/056336, both of which are incorporated herein by reference.

TECHNICAL FIELD

The invention relates to a continuous fastener element which is formed by molding synthetic resinous monofilament in a coil shape or a zigzag shape, and particularly, to a continuous fastener element which suppresses gloss and luster of an element surface and has new texture.

BACKGROUND ART

In general, a continuous fastener element having a coil shape or a zigzag shape and used in a slide fastener is manufactured in a manner such that a thermoplastic synthetic resinous material is extruded to mold linear monofilament, the obtained monofilament is molded in a coil shape or a zigzag shape, and a part of the monofilament is pressed at a constant interval to mold a coupling head.

Further, for example, Japanese Patent Application Publication No. 7-63411 (Patent Document 1) or the specification of Japanese Patent No. 3698562 (Patent Document 2) discloses a method or a device for manufacturing a coil-shaped continuous fastener element by molding synthetic resinous monofilament.

The device disclosed in Patent Document 1 includes a supply roller which normally supplies a constant amount of synthetic resinous monofilament, a stamp-molding portion which has a pair of molding rollers stamp-molding a coupling head or the like on the monofilament supplied from the supply roller, and a coil-shaped element molding portion including mandrel which molds the stamp-molded monofilament into a coil-shaped continuous fastener element.

The supply roller in Patent Document 1 includes a supply pulley around which the monofilament is wound a number of times and supplies the monofilament to the stamp-molding portion, so that a constant amount of the monofilament may be normally supplied to the stamp-molding portion by the supply pulley.

For example, as shown in FIG. 8, a stamp-molding portion 50 includes a circular roller 51 and an annular roller 52 serving as the pair of molding rollers, and a recess-like tooth 54 is provided on an outer peripheral surface 53 of the circular roller 51 at a constant interval. Further, a protrusion-like tooth 56 is provided on an inner peripheral surface 55 of the annular roller 52 at a constant interval to correspond the position of the recess-like tooth 54 of the circular roller 51, whereby the stamp-molding process may be performed along with the circular roller 51. Furthermore, the circular roller 51 and the annular roller 52 are configured to revolve around a mandrel to be described later of the coil-shaped element molding portion while they rotate.

In the stamp-molding portion 50, the circular roller 51 and the annular roller 52 are rotated, and monofilament 57 supplied from the supply roller is guided to a gap between the outer peripheral surface 53 of the circular roller 51 and the inner peripheral surface 55 of the annular roller 52. Accordingly, the monofilament 57 is press-molded by the protrusion-like tooth 56 of the annular roller 52 and the recess-like tooth 54 of the circular roller 51, so that a coupling head or the like having a predetermined shape is formed on the monofilament 57.

The coil-shaped element molding portion includes a rod-like mandrel which is fixed to a mandrel holder, and the circular roller 51 and the annular roller 52 revolve around the mandrel while they rotate to wind the monofilament 57 having the coupling head molded thereon around the mandrel, so that the monofilament 57 is molded in a coil shape. Furthermore, a passage is provided in the mandrel in the longitudinal direction to allow a core thread to pass through.

Therefore, the monofilament 57 having the coupling head molded by the circular roller 51 and the annular roller 52 of the stamp-molding portion 50 is guided to the mandrel of the coil-shaped element molding portion, and the circular roller 51 and the annular roller 52 revolve around the mandrel, so that the monofilament 57 is wound around the mandrel to be molded in a coil shape. Also, the core thread is discharged from the front end of the mandrel through the passage provided inside the mandrel, so that the coil-shaped continuous fastener element having the core thread inserted therethrough is manufactured.

On the other hand, the device disclosed in Patent Document 2 includes a monofilament supply portion which supplies monofilament, a winding portion which has a mandrel and winds the monofilament around the mandrel to have a coil shape, and an element molding portion which molds a coupling head or the like to have a predetermined shape on the monofilament wound around the mandrel.

The monofilament supply portion includes a large spool around which the monofilament is wound, a flier which guides the monofilament unwound from the spool, and a guide roller which switches the carriage direction of the monofilament.

The winding portion includes a rotary body which has a monofilament guide hole, a rod-like mandrel, a core thread bobbin which supplies a core thread, and a core thread drawing body which draws out the core thread from the core thread bobbin. Further, a core thread guide groove is formed in the mandrel throughout the entire length thereof to guide the core thread in a sliding manner.

In the winding portion, the monofilament supplied from the monofilament supply portion is guided to the mandrel through the monofilament guide hole of the rotary body by rotating the rotary body, so that the monofilament is wound around the mandrel to mold the monofilament in a coil shape.

The element molding portion includes a pair of screws which is disposed with the mandrel of the winding portion interposed therebetween, upper and lower coupling head forming portions which are disposed with the mandrel interposed therebetween and form a coupling head on the monofilament molded in a coil shape, and an upper leg forming portion which bends a part of the monofilament formed as a continuous fastener element upper leg portion in a step shape.

Accordingly, the monofilament wound around the mandrel is carried forward in a coil shape with the rotation of the left and right screws. In accordance with the carriage, the coil-shaped monofilament first reaches the coupling head forming portion, and the coupling head forming portion press-molds the monofilament at a predetermined interval, so that a coupling head is formed on the monofilament.

Subsequently, the monofilament having the coupling head formed thereon is carried to the upper leg forming portion with the rotation of the left and right screws, and the monofilament is punched at a predetermined interval by the upper leg forming portion, so that a step portion is formed on a portion formed as the fastener element upper leg portion. Subsequently, the core thread discharged from the front end of the mandrel is inserted into the coil-shaped monofilament, so that a coil-shaped continuous fastener element is manufactured which has a step portion accommodating a sewing thread in the upper leg portion.

Incidentally, in the slide fastener having the coil-shaped continuous fastener element, a lubricating material is applied to the outer peripheral surface of the continuous fastener element in order to smoothly slide the slider along the element row or smoothly engage the left and right element rows with each other.

Further, Japanese Patent Application Publication No. 1-19888 (Patent Document 3) discloses a configuration in which minute grooves or recesses are formed on the entire outer peripheral surface (the surface) of the continuous fastener element when a lubricating material is applied to the outer peripheral surface of the continuous fastener element. Furthermore, Patent Document 3 discloses an example of a method of forming minute grooves or recesses on the outer peripheral surface of the continuous fastener element in a manner such that minute uneven portions are formed on an opening of a nozzle extruding monofilament, the surface of the monofilament is rubbed by an abrasive member with minute particles, or a sand blasting process of blasting minute particles is performed.

In this manner, when minute grooves or recesses are formed on the outer peripheral surface of the continuous fastener element, the lubricating material applied to the continuous fastener element may be buried in the grooves or recesses, so that the lubricating material may be properly attached to the continuous fastener element.

For this reason, for example, when the slide fastener having the continuous fastener element is cleaned, it is possible to prevent the lubricating material from being separated from the continuous fastener element even when an external force is exerted on the lubricating material applied to the continuous fastener element during the cleaning or the like or an external force is exerted on the lubricating material due to the contact between the coupling heads of the left and right continuous fastener elements or the contact between the continuous fastener element and the slider when the slide fastener is opened or closed. Therefore, even when the slide fastener is repeatedly cleaned or the slider is repeatedly opened or closed, it is possible to sustain the effect of the lubricating material and smoothly perform the sliding action of the slider or the engaging action of the element rows for a long period of time.

On the other hand, Japanese Patent Application Laid-Open No. 2005-160667 (Patent Document 4) discloses a configuration in which a plurality of independent fastener elements are fixed to a fastener tape by injection-molding even the fastener tape using, for example, a synthetic resin, wherein minute uneven portions are formed on the outer surface of each of the independent fastener elements, so that the outer peripheral surface is finished into a pearskin of which a ten-point average roughness is from 0.8 to 200 μm.

In Patent Document 4, the method of forming the uneven portions on the outer surfaces of the independent fastener elements is not particularly limited. However, for example, a method is disclosed in which uneven portions are formed on a cavity surface of a mold used for injection-molding to form minute uneven portions on the outer surfaces of the independent fastener elements.

Then, according to Patent Document 4, since the outer surface of the independent fastener element is finished into the pearskin, light is irregularly reflected from the pearskin surface. For this reason, the slide fastener having the fastener element is dyed in the same bath to decrease a difference in the brightness between the fastener element and the fastener tape, so that the fastener element and the fastener tape have the same color tone.

Furthermore, in Patent Document 4, the shape of the slide fastener is not particularly limited, and there is a description that a coil-shaped continuous fastener element molded from monofilament may be used as the fastener element in addition to the independent fastener element formed by the above-described injection molding.

Patent Document 1: Japanese Patent Application Publication No. 7-63411
Patent Document 2: Specification of Patent No. 3698562
Patent Document 3: Japanese Patent Application Publication No. 1-19888
Patent Document 4: Japanese Patent Application Laid-Open No. 2005-160667

DISCLOSURE OF INVENTION

Problem to be Solved by the Invention

When synthetic resinous monofilament is molded as a coil-shaped or a zigzag-shaped continuous fastener element, peculiar gloss and luster of the monofilament are generally applied to the obtained continuous fastener element. However, when the slide fastener having the continuous fastener element with such gloss and luster is attached to products such as bags, shoes, and clothes, gloss and luster of the continuous fastener element are too outstanding in accordance with the design of the product, so that they do not match the design of the product.

Furthermore, in order to solve the problem relating to gloss and luster of the continuous fastener element, a method may be supposed in which a plurality of minute recesses are formed on the entire outer peripheral surface of the continuous fastener element to reduce or remove gloss and luster of the continuous fastener element.

For example, although the purpose is different, minute recesses may be formed on the entire outer peripheral surface of the continuous fastener element by using the method disclosed in Patent Document 3, so that gloss and luster of the continuous fastener element may be reduced or removed. Further, in Patent Document 4, the specific manufacturing method is not described, but there is a description that uneven portions may be formed on the outer peripheral surface of the continuous fastener element or the like molded from the monofilament.

However, when minute recesses are formed on the entire outer peripheral surface of the continuous fastener element in this manner, for example, when the slider is slid to open or close the slide fastener, the resistance between the slider and the continuous fastener element or the resistance between the coupling heads of the left and right continuous fastener elements increases. Accordingly, there is a problem that the sliding action of the slider becomes difficult and the operability of the slide fastener is degraded.

The invention is made in view of such circumstances of the background art, and the specific object is to provide a continuous fastener element capable of reducing or removing peculiar gloss and luster of monofilament and suppressing a degradation of the operability of a slide fastener when the slide fastener is formed and a fastener stringer having the continuous fastener element.

Means for Solving the Problem

In order to achieve the above object, the invention provides a continuous fastener element formed by molding thermoplastic synthetic resinous monofilament in a coil shape or a zigzag shape, the continuous fastener element including: a coupling head; upper and lower leg portions which extend from the coupling head in the width direction; and a connecting portion which connects the leg portions adjacent to each other in the longitudinal direction, being characterized in that surfaces of the coupling head, the leg portions, and the connecting portion are each formed as a rough surface with a plurality of recesses, and a head surface of the coupling head is formed to have an average roughness Ra smaller than that of outer peripheral surfaces of the leg portions.

In the continuous fastener element according to the invention, the average roughness Ra of the head surface of the coupling head is preferably 90% or less of the average roughnesses Ra of the outer peripheral surfaces of the leg portions.

Particularly, the outer peripheral surfaces of the leg portions are preferably each formed to have the average roughness Ra equal to or more than 0.1 μm and equal to or less than 100 μm, and the head surface of the coupling head is preferably formed to have the average roughness Ra equal to or more than 0.05 μm and equal to or less than 20 μm.

In the continuous fastener element according to the invention, an outer peripheral surface of the connecting portion is preferably formed to have an average roughness Ra smaller than those of the outer peripheral surfaces of the leg portions, in which case the average roughness Ra of the connecting portion is preferably 90% or less of the average roughnesses Ra of the leg portions.

Particularly, an outer peripheral surface of the connecting portion is preferably formed to have an average roughness Ra equal to or more than 0.05 μm and equal to or less than 20 μm.

Furthermore, according to the invention, the fastener stringer having the continuous fastener element with the above-described configuration is provided.

Next, the method of manufacturing the continuous fastener element according to the invention is mainly characterized in that it includes: an extruding process of extruding a thermoplastic synthetic resinous material to mold linear monofilament; a roughening process of roughening an outer peripheral surface of the monofilament; and an element molding process of molding the roughened monofilament in a coil shape or a zigzag shape and pressing a part of the monofilament at a constant interval to mold a coupling head or of pressing a part of the roughened monofilament at a constant interval to mold a coupling head and molding the monofilament in a coil shape or a zigzag shape, wherein a part of the monofilament is heated and pressed when the coupling head is molded in the element molding process, so that the coupling head is molded and an average roughness Ra of an outer peripheral surface of the coupling head is made smaller than those of outer peripheral surfaces of the leg portions.

In the method of manufacturing a continuous fastener element according to the invention, in the element molding process, the monofilament is preferably heated and molded in a coil shape or a zigzag shape.

Furthermore, in the roughening process, the outer peripheral surface of the monofilament may be roughened in a manner such that the abrasive material is blasted from the blast nozzle to the monofilament or the monofilament is guided between the plurality of polishing rollers to come into slid-contact with the polishing surfaces of the polishing rollers.

Effect of the Invention

In the coil-shaped or the zigzag-shaped continuous fastener element according to the invention, the plurality of recesses are formed on the surfaces of the coupling head, the leg portion, and the connecting portion, that is, the entire outer peripheral surface of the continuous fastener element, the entire outer peripheral surface is formed as the rough surface, and the head surface of the coupling head has the average roughness Ra smaller than that of the outer peripheral surface of the leg portion.

When the recesses are formed on the entire outer peripheral surface of the continuous fastener element, peculiar gloss and luster of the monofilament may be easily reduced or removed from the continuous fastener element. Further, since the head surface of the coupling head has the average roughness Ra smaller than that of the leg portion, when the slide fastener is formed by using the continuous fastener element, the left and right element rows may be smoothly engaged or disengaged to or from each other since the resistance between the coupling heads of the left and right continuous fastener elements may be made small. Furthermore, the average roughness Ra of the invention is measured on the condition that a cut-off value is 0.08 mm on the basis of JIS B 0601.

In the continuous fastener element of the invention, the average roughness Ra of the head surface of the coupling head is set to be 90% or less, and desirably, 60% or less of the average roughness Ra of the outer peripheral surface of the leg portion. Accordingly, even when the recesses are formed on the outer peripheral surface of the leg portion to remove gloss and luster from the continuous fastener element, it is easily possible to decrease the resistance between the coupling heads of the left and right continuous fastener elements when the slide fastener is formed.

In this case, since the outer peripheral surface of the leg portion has the average roughness Ra equal to or more than 0.1 μm and equal to or less than 100 μm, gloss and luster of the continuous fastener element may be reliably reduced or removed. Further, since the head surface of the coupling head has the average roughness Ra equal to or more than 0.05 μm and equal to or less than 20 μm, the resistance between the coupling heads of the left and right continuous fastener elements may be reliably decreased.

Further, in the continuous fastener element of the invention, the outer peripheral surface of the connecting portion has the average roughness Ra smaller than that of the outer peripheral surface of the leg portion, and particularly, the average roughness Ra of the connecting portion is set to be 90% or less, and desirably, 60% or less of the average roughness Ra of the leg portion. Accordingly, when the slide fastener is formed by using the continuous fastener element, the resistance between the continuous fastener element and the slider may be decreased. For this reason, the left and right element rows may be easily engaged or disengaged to or from each other by smoothly sliding the slider along the element row.

In this case, since the outer peripheral surface of the connecting portion has the average roughness Ra equal to or more than 0.05 μm and equal to or less than 20 μm, the resistance between the continuous fastener element and the slider may be reliably decreased.

Further, in the fastener stringer of the invention having the continuous fastener element with the above-described configuration, gloss and luster of the continuous fastener element are reduced or removed, and the resistance between the coupling heads of the left and right continuous fastener elements is small, so that the left and right element rows may be smoothly engaged or disengaged to or from each other. For this reason, the slide fastener obtained by using the fastener stringer may be suitably used for, for example, the products which do not match the design due to peculiar gloss and luster of the monofilament.

Next, the method of manufacturing the continuous fastener element according to the invention includes the extruding process of extruding and molding the linear monofilament, the roughening process of roughening the outer peripheral surface of the monofilament, and the element molding process of molding the roughened monofilament into a coil-shaped or a zigzag-shaped continuous fastener element. Furthermore, in the element molding process, a part of the monofilament is heated and pressed when the coupling head is molded.

According to the manufacturing method of the invention, it is possible to easily and stably manufacture a coil-shaped or a zigzag-shaped continuous fastener element in which recesses are formed on surfaces of a coupling head, a leg portion, and a connecting portion and a head surface of the coupling head has an average roughness Ra smaller than that of the outer peripheral surface of the leg portion.

Further, in the invention, the monofilament is heated and molded in a coil shape or a zigzag shape in the element molding process. Accordingly, the average roughness Ra of the surface of the coupling head of the obtained continuous fastener element may be reliably made smaller than the average roughness Ra of the outer peripheral surface of the leg portion, and the average roughness Ra of the outer peripheral surface of the connecting portion may be easily made smaller than the average roughness Ra of the outer peripheral surface of the leg portion.

Furthermore, in the roughening process, the outer peripheral surface of the monofilament is roughened in a manner such that the abrasive material is blasted from the blast nozzle to the monofilament or the monofilament is guided between the plurality of polishing rollers to come into slide-contact with the polishing surfaces of the polishing rollers. Accordingly, the outer peripheral surface may be easily formed as a rough surface by forming the plurality of recesses on the outer peripheral surface of the monofilament.

Figure 1:
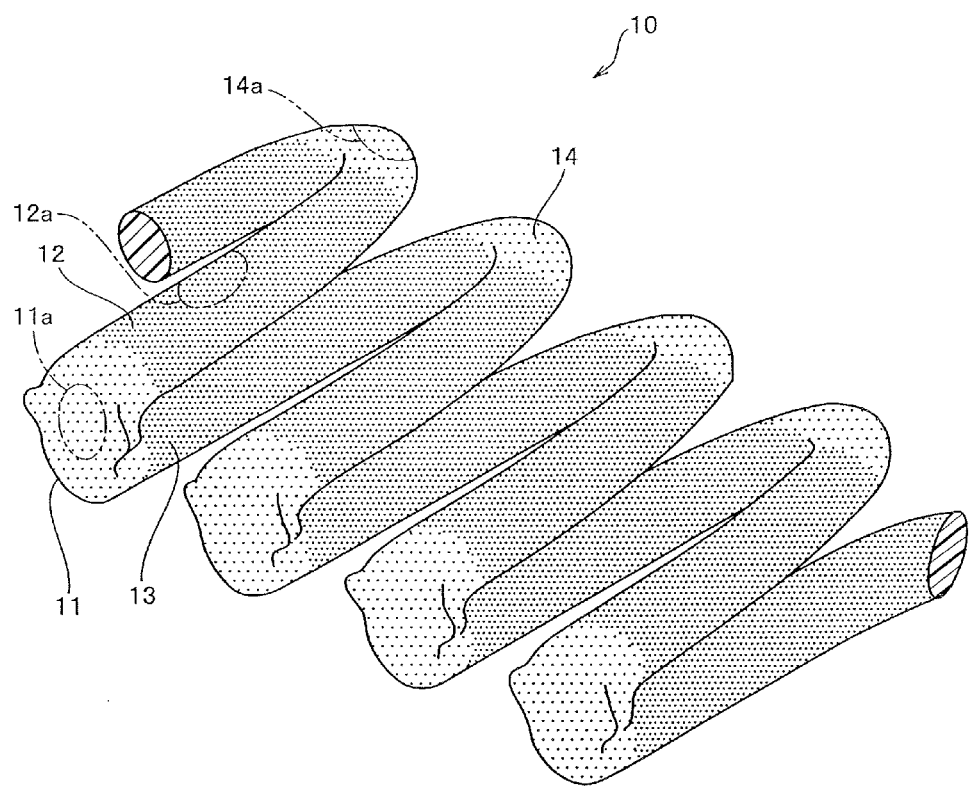
FIG. 1 is a perspective view illustrating a continuous fastener element according to the invention.

EXPLANATIONS OF LETTERS AND NUMERALS 10 continuous fastener element
11 coupling head
11a measurement area of average roughness Ra
12 upper leg portion
12a measurement area of average roughness Ra
13 lower leg portion
14 connecting portion
14a measurement area of average roughness Ra
20 slide fastener
21 core thread
22 fastener tape
23 sewing thread
24 element row
25 fastener stringer
26 slider
31 extruding process
32 roughening process
33 element molding process
36 polishing roller
37 monofilament
38 blast nozzle
39 abrasive material
41 winding portion
41a mandrel
42 element molding portion
42a screw
42b coupling head forming portion

BEST MODE FOR CARRYING OUT THE INVENTION

Hereinafter, an embodiment of the invention will be described in detail by referring to the drawings. Furthermore, the invention is not limited to the embodiment to be described below, but may be modified into various forms so long as the same configuration and effect as those of the invention are obtained.

For example, a continuous fastener element to be described in the embodiment below is formed by molding monofilament in a coil shape, but the invention is not limited thereto. The continuous fastener element may be formed by molding monofilament in a zigzag shape.

Here, FIG. 1 is a perspective view illustrating the continuous fastener element of the embodiment. Furthermore, in the description below, the element length direction indicates a length direction of a fastener tape when a fastener stringer is formed by using the continuous fastener element, and the element width direction indicates a width direction of a fastener tape.

A continuous fastener element 10 of the embodiment is formed by molding monofilament composed of a thermoplastic synthetic resin such as polyamide or polyester to have a coil shape, and includes a flat coupling head 11, an upper leg portion 12 and a lower leg portion 13 which respectively extend from the coupling head 11 in the element width direction, and a connecting portion 14 which connects the upper leg portion 12 (or the lower leg portion 13) of the continuous fastener element 10 to the lower leg portion 13 (or the upper leg portion 12) of another continuous fastener element 10 adjacent to the continuous fastener element in the element length direction.

Furthermore, when the coupling head 11, the upper leg portion 12, the lower leg portion 13, and the connecting portion 14 mentioned in the invention are strictly defined, the coupling head 11 indicates a portion contacting at least opposite coupling head 11 and contacting a guide post of a slider 26. Further, the connecting portion 14 indicates a portion contacting the flange of at least the slider 26, and the upper leg portion 12 and the lower leg portion 13 indicate portions other than the coupling head 11 and the connecting portion 14.

Further, a plurality of recesses are provided on the entire surface of the continuous fastener element 10, so that the surface is formed as a rough surface. The entire average value of the average roughness Ra of the continuous fastener element 10 is set to be equal to or more than 0.05 μm and equal to or less than 100 μm, desirably equal to or more than 0.05 μm and equal to or less than 20 μm, and more desirably equal to or more than 0.05 μm and equal to or less than 8 μm. Furthermore, the average value of the average roughness Ra mentioned herein indicates an average value of measurement values obtained when the average roughness Ra is measured at a plurality of positions (for example, 10 positions) of the continuous fastener element 10. In this manner, since the entire average value of the average roughness Ra of the continuous fastener element 10 is set to be 0.05 μm or more, gloss and luster of the monofilament may be effectively reduced or removed from the element surface.

Further, since the entire average value of the average roughness Ra of the continuous fastener element 10 is set to be 100 μm or less, the monofilament may be prevented from being disconnected when the monofilament is molded into the continuous fastener element 10. Further, as described below, since a force applied from an abrasive fabric or an abrasive material to the monofilament may be made small when the outer peripheral surface of the monofilament is roughened by a polishing treatment or a blasting treatment in a roughening process 32, the quality (property) of the monofilament may be prevented from being changed in the roughening process 32 or the subsequent processes. Furthermore, the recess formed in the element surface (the outer peripheral surface) of the continuous fastener element 10 may be a hole-like recess or a groove-like recess, and the shape thereof is not particularly limited.

Furthermore, in the continuous fastener element 10 of the embodiment, the average roughness Ra of the coupling head 11 is formed to be different from the average roughnesses Ra of the upper and lower leg portions 12 and 13. Further, the average roughness Ra of the connecting portion 14 is formed to be different from the average roughnesses Ra of the upper and lower leg portions 12 and 13. Especially, in this case, the surface (the outer peripheral surface) of the coupling head 11 and the surface (the outer peripheral surface) of the connecting portion 14 each has an average roughness Ra which is 90% or less and desirably 60% or less of the surfaces (the outer peripheral surfaces) of the upper and lower leg portions 12 and 13.

More specifically, in the embodiment, the average values of the average roughnesses Ra of the upper and lower leg portions 12 and 13 are set to be equal to or more than 0.10 μm and equal to or less than 100 μm, desirably equal to or more than 0.10 μm and equal to or less than 20 μm, and more desirably equal to or more than 0.10 μm and equal to or less than 8 μm. In this manner, since the average values of the average roughnesses Ra of the upper and lower leg portions 12 and 13 occupying a large area in the continuous fastener element 10 are 0.10 μm or more, gloss and luster of the surfaces of the leg portions may be effectively suppressed. Further, since the average values of the average roughness Ra of the upper and lower leg portions 12 and 13 are set to be 100 μm or less, as described above, the monofilament may be prevented from being disconnected and the quality of the monofilament may be prevented from being changed.

In particular, when the average values of the average roughnesses Ra of the upper and lower leg portions 12 and 13 are set to be 20 μm or less, as described below, it is possible to prevent a sewing thread 23 from being easily cut by the recess or the like of the element surface when the continuous fastener element 10 is sewn to a fastener tape 22 using the sewing thread 23.

Furthermore, when the average values of the average roughnesses Ra of the upper and lower leg portions 12 and 13 are set to be 8 μm or less, the outer peripheral surface of the monofilament to be molded in a coil shape may be relatively smoothly formed when the continuous fastener element 10 is manufactured. Accordingly, the monofilament may be smoothly delivered or carried, so that the monofilament may be stably molded into the coil-shaped continuous fastener element 10 and a decrease in the yield rate may be prevented. Furthermore, in this case, the element manufacturing device molding the monofilament in a coil shape may be stably operated and the quality of the continuous fastener element 10 to be manufactured may be stabilized.

On the other hand, the average values of the average roughnesses Ra of the coupling head 11 and the connecting portion 14 of the continuous fastener element 10 are 90% or less (desirably 60% or less) of the average values of the average roughnesses Ra of the upper and lower leg portions 12 and 13, and is set to be equal to or more than 0.05 μm and equal to or less than 20 desirably equal to or more than 0.05 μm and equal to or less than 10 μm, and more desirably equal to or more than 0.05 μm and equal to or less than 4 μm.

In this manner, since the average values of the average roughnesses Ra of the coupling head 11 and the connecting portion 14 are set to be 0.05 μm or more, gloss and luster of the coupling head 11 and the connecting portion 14 may be suppressed. Further, since the average values of the average roughnesses Ra of the coupling head 11 and the connecting portion 14 are set to be 20 μm or less, as described below, when the slide fastener 20 is formed by using the continuous fastener element 10, the resistance between the left and right coupling heads 11 which easily cause a friction therebetween when opening or closing the slide fastener 20 may be made small. Further, the resistance between the connecting portion 14 and the slider 26 of the continuous fastener element 10 may be made small.

Figure 2:
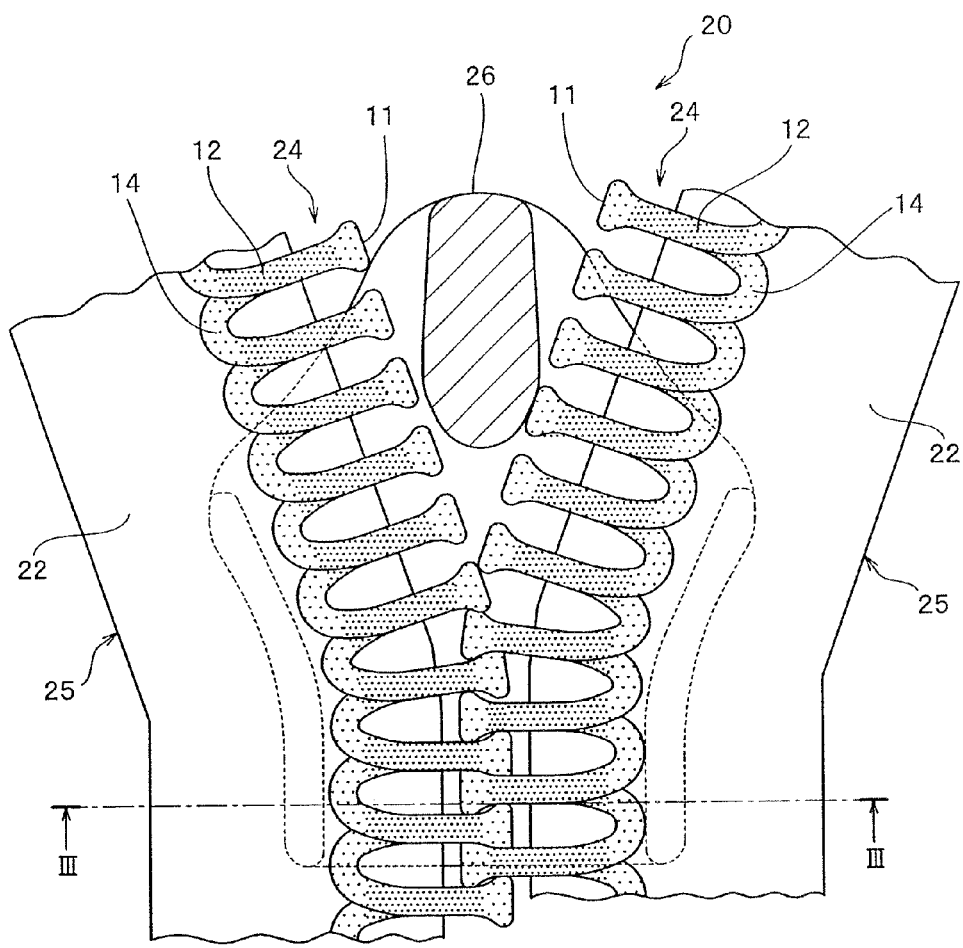
FIG. 2 is a cross-sectional view illustrating a slide fastener having the continuous fastener element.
Figure 3:
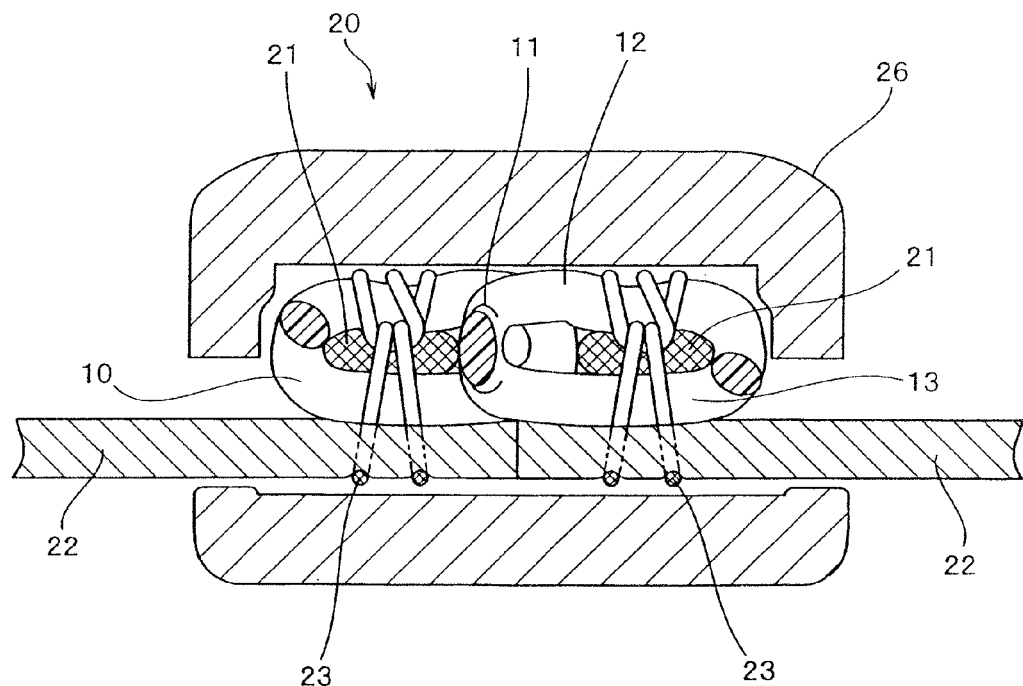
FIG. 3 is a cross-sectional view taken along the line shown in FIG. 2.

Then, when the slide fastener 20 shown in FIGS. 2 and 3 is formed by using the coil-shaped continuous fastener element 10 of the embodiment, a core thread 21 is first inserted through the upper and lower leg portions 12 and 13 of the continuous fastener element 10 along the element length direction, and the continuous fastener element 10 is sewn to the tape side edge of the fastener tape 22 using the sewing thread 23 while the core thread 21 is inserted therethrough. Furthermore, in FIG. 2, the core thread 21 and the sewing thread 23 are not shown to easily understand the characteristics of the continuous fastener element 10.

Accordingly, a pair of left and right fastener stringers 25 is obtained which includes left and right element rows 24 having the continuous fastener element 10. Furthermore, the slide fastener 20 is formed by inserting the slider 26 into the left and right element rows 24 of the obtained fastener stringer 25. Furthermore, the slider 26 used in the slide fastener 20 of the embodiment has the same configuration as the general slider used in the existing slide fastener.

The slide fastener 20 manufactured in this manner is formed so that the entire surface of the continuous fastener element 10 has a plurality of minute recesses exposed on the surface, and the entire average value of the average roughness Ra of the continuous fastener element 10 is set to be equal to or more than 0.05 μm and equal to or less than 100 μm.

For this reason, the slide fastener 20 does not have original gloss and luster of the monofilament in the continuous fastener element 10 and has texture different from the existing general slide fastener. Therefore, the slide fastener 20 of the embodiment may be suitably used in products such as bags, shoes, and clothes which cannot be manufactured using the slide fastener with gloss and luster which do not match the design thereof.

Furthermore, in the continuous fastener element 10 disposed in the slide fastener 20, the average values of the average roughnesses Ra of the outer peripheral surfaces of the coupling head 11 and the connecting portion 14 are set to be 90% or less of the average values of the average roughnesses Ra of the outer peripheral surfaces of the upper and lower leg portions 12 and 13. For this reason, for example, when the left and right element rows 24 engage with each other or disengage from each other by sliding the slider 26 along the element row 24, the resistance between the left and right coupling heads 11 may be made small and the resistance between the connecting portion 14 and the slider 26 of the continuous fastener element 10 may be made small.

Therefore, since the slider 26 may be smoothly slid along the element row 24 and the coupling heads 11 of the left and right continuous fastener elements 10 may be smoothly engaged with each other or the engaged left and right coupling heads 11 may be smoothly disengaged from each other, the operability of the slide fastener 20 may be improved.

Next, a method of manufacturing the continuous fastener element 10 according to the embodiment will be described by referring to the drawings.

Figure 4:
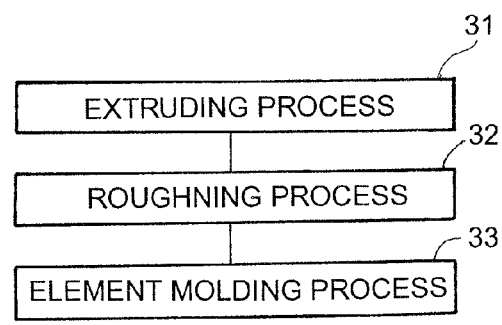
FIG. 4 is a flowchart illustrating a method of manufacturing the continuous fastener element according to the invention.
Figure 5:
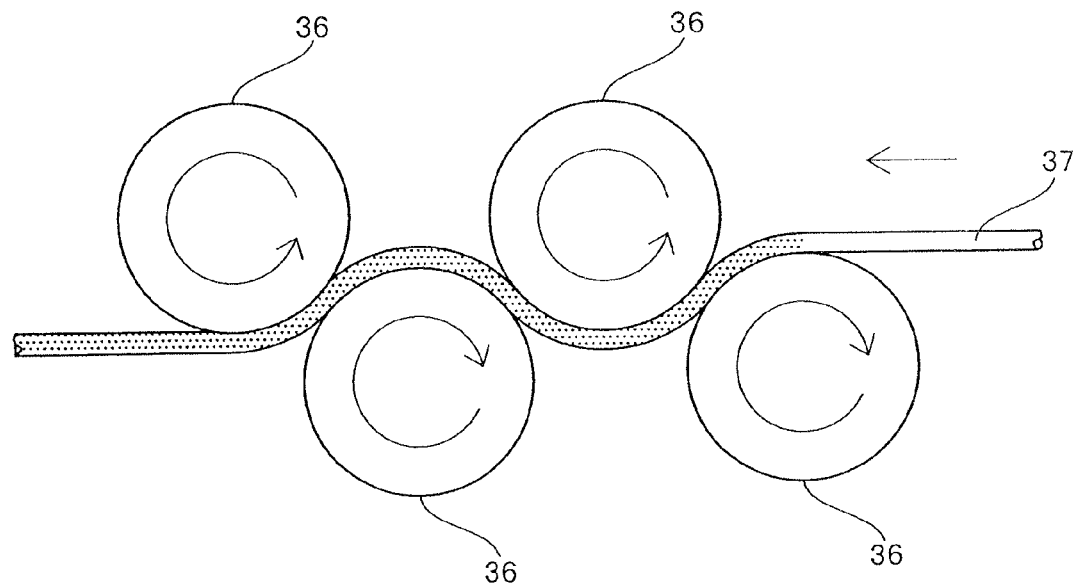
FIG. 5 is a schematic diagram illustrating a device for roughening an outer peripheral surface of monofilament in a roughening process.

Here, FIG. 4 is a flowchart illustrating the method of manufacturing the continuous fastener element 10. Further, FIG. 5 is a schematic diagram illustrating a device for roughening the outer peripheral surface of the monofilament in the roughening process 32.

First, in an extruding process 31 shown in FIG. 4, a melted thermoplastic synthetic resinous material is extruded from an extruding nozzle by using a generally known extruding unit, so that linear continuous monofilament is formed. The extruded monofilament is arranged in a linear shape and is stretched by a predetermined magnification ratio in order to obtain a necessary diameter and a strong force.

Subsequently, the obtained monofilament undergoes the roughening process 32. As shown in FIG. 5, the roughening process 32 is performed by a device in which a plurality of polishing rollers 36 each having an abrasive fabric attached to the surface thereof are alternately disposed in the vertical direction. In this device, monofilament 37 is guided between the upper and lower polishing rollers 36 from a supply portion (not shown) to come into slide-contact with the abrasive fabrics of the polishing rollers 36 and each of the polishing rollers 36 is rotated in the direction opposite to the guide direction of the monofilament 37, so that a plurality of linear recesses are formed on the entire surface (the outer peripheral surface) of the monofilament 37.

In this case, the process conditions such as the number of the polishing rollers 36 or the type of the abrasive fabric are appropriately set so that the average value of the average roughness Ra of the monofilament after the roughening process 32 is equal to or more than 0.10 μm and equal to or less than 100 μm, desirably equal to or more than 0.10 μm and equal to or less than 20 μm, and more desirably equal to or more than 0.10 μm and equal to or less than 8 μm. Further, in order to uniformly roughen the entire monofilament, the values of the process conditions may be fed back while rotating the monofilament 37 about the axial direction.

Figure 6:
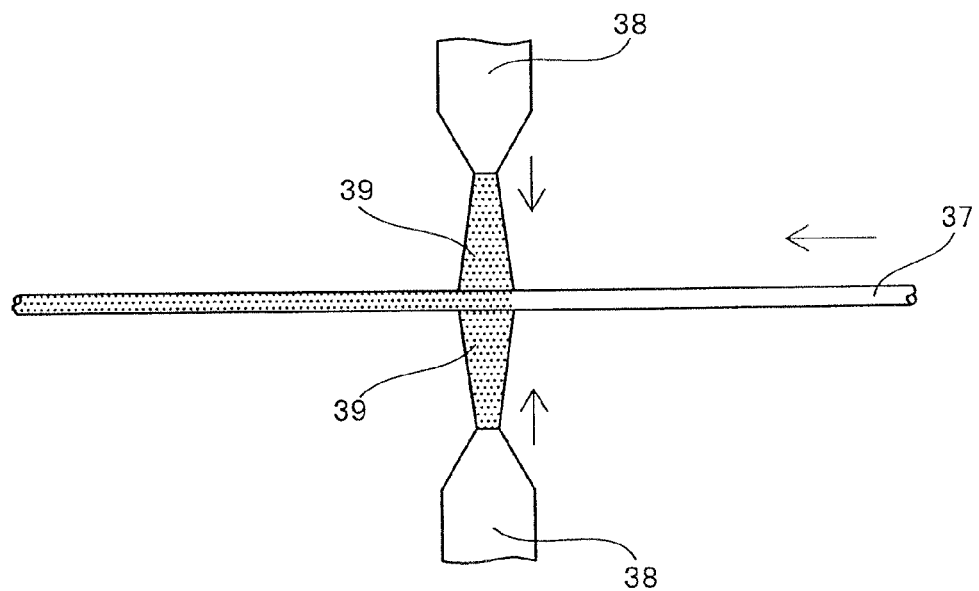
FIG. 6 is a schematic diagram illustrating another device for roughening the outer peripheral surface of the monofilament in the roughening process.

Furthermore, the device or the method of forming the recess on the entire surface of the monofilament 37 in the roughening process 32 is not particularly limited, but for example, the device or the like shown in FIG. 6 may be used instead of the device shown in FIG. 5. The device shown in FIG. 6 is configured to carry the monofilament 37 supplied from a supply portion (not shown) and blast an abrasive material 39 toward the monofilament 37 from blast nozzles 38 disposed to be away from each other in the vertical direction (or the horizontal direction) with respect to the carriage path of the monofilament 37. Even using such a device, a recess may be easily formed on the entire surface (the outer peripheral surface) of the monofilament 37, so that the surface of the monofilament may be finished into a pearskin.

Next, an element molding process 33 is performed which molds the monofilament 37 roughened in the roughening process 32 in a coil shape and presses the monofilament 37 to mold the coupling head 11. In the element molding process 33, for example, the device disclosed in Patent Document 1 or Patent Document 2 may be used.

The device disclosed in Patent Document 1 is not shown in the drawing, but as described above, the device includes a supply roller which normally supplies a constant amount of monofilament, a stamp-molding portion which has a pair of molding rollers stamp-molding a coupling head or the like in the monofilament supplied from the supply roller, and a coil-shaped element molding portion which includes a mandrel molding the stamp-molded monofilament into a coil-shaped continuous fastener element.

When the monofilament supplied from the supply roller is first pressed at a predetermined pressing condition in the stamp-molding portion using such a device, the pressed portion of the monofilament is plastically deformed, whereby the coupling head 11 may be molded at a constant interval in the monofilament and the plurality of recesses formed on the surface of the pressed portion may be decreased in size or a part of the recess may be removed.

Further, in this case, it is desirable to provide, for example, a first monofilament heater in the stamp-molding portion to heat the monofilament when the monofilament is pressed. Since such a first monofilament heater is provided, the monofilament may be pressed while being heated when the stamp-molding portion presses the monofilament to form the coupling head 11. Accordingly, the recess formed in the pressed portion of the monofilament may be reliably decreased in size or a part of the recess may be more reliably removed.

Since the stamp-molding portion performs the above-described process, the coupling head 11 may be stably formed at a constant interval of the monofilament and the average roughness Ra of the outer peripheral surface of the coupling head 11 may be decreased in size.

Subsequently, the monofilament with the coupling head 11 is wound around the mandrel in a predetermined winding condition in the coil-shaped element molding portion, so that the monofilament is bent at the portions of the coupling head 11 and the connecting portion 14 to be molded in a coil shape, and the average roughnesses Ra of the outer peripheral surfaces of the coupling head 11 and the connecting portion 14 may be made small by the bending process at the coupling head 11 and the connecting portion 14.

Further, in this case, a passage is provided inside the mandrel of the coil-shaped element molding portion to allow the core thread to pass therethrough, so that the core thread is inserted into the coil-shaped element molding portion. Furthermore, it is desirable to provide, for example, a second monofilament heater in the coil-shaped element molding portion to heat the monofilament when the monofilament is wound.

Since the second monofilament heater is provided, the monofilament may be bent while being heated when the coil-shaped element molding portion winds the monofilament around the mandrel. For this reason, the recess formed in the bent portion of the monofilament may be reliably decreased in size or a part of the recess may be more reliably removed.

Furthermore, in the element molding process 33, the pressing condition of the stamp-molding portion or the winding condition of the coil-shaped element molding portion and the heating condition of the monofilament heater when the first and second monofilament heaters are provided are appropriately set so that the average roughnesses Ra of the outer peripheral surfaces of the coupling head 11 and the connecting portion 14 after the element molding process 33 are equal to or more than 0.05 µm and equal to or less than 20 µm, desirably equal to or more than 0.05 µm and equal to or less than 10 µm, and more desirably equal to or more than 0.05 µm and equal to or less than 4 µm.

For example, when the first and second monofilament heaters heat the monofilament, it is desirable to heat the monofilament, for example, at a temperature of 50° C. or more and particularly at a temperature equal to or more than 90° C. and equal to or less than 140° C. Accordingly, the average roughnesses Ra of the coupling head 11 and the connecting portion 14 may be effectively made small.

Furthermore, in the stamp-molding portion or the coil-shaped element molding portion, when the average roughness Ra can be controlled within the predetermined range by appropriately setting the pressing condition of the stamp-molding portion or the winding condition of the coil-shaped element molding portion without heating the monofilament, the monofilament heater may not be provided in the stamp-molding portion or the coil-shaped element molding portion.

In this manner, the continuous fastener element 10 of the embodiment may be easily obtained by performing the element molding process 33 using the device disclosed in Patent Document 1.

On the other hand, the continuous fastener element 10 of the embodiment may be obtained by performing the element molding process 33 even using the device disclosed in Patent Document 2.

Figure 7:
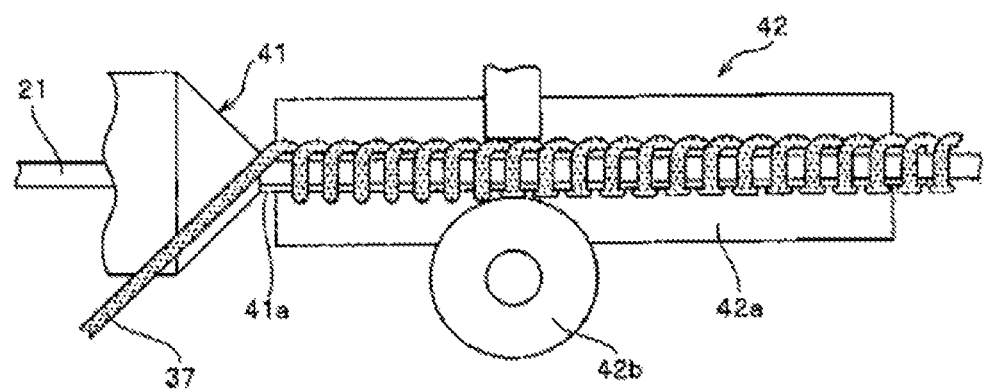
FIG. 7 is a schematic diagram illustrating a device for molding a continuous fastener element in an element molding process.
Figure 8:
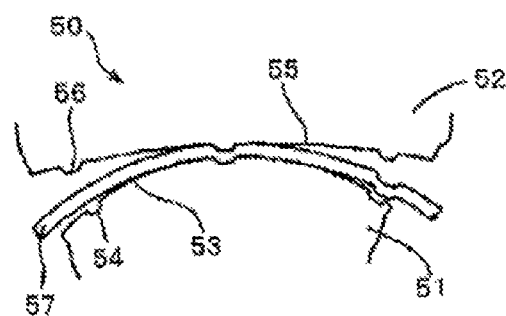
FIG. 8 is a schematic diagram illustrating an existing stamp-molding device.

In this case, as shown in FIG. 7, the device includes a monofilament supply portion (not shown) which supplies monofilament, a winding portion 41 which winds the monofilament 37 around a mandrel 41a in a coil shape, and an element molding portion 42 which molds the coupling head 11 in the monofilament 37 wound around the mandrel 41a.

The winding portion 41 of the device includes a rotary body (not shown), the rod-like mandrel 41a, a core thread bobbin (not shown) which supplies the core thread 21, and a core thread drawing body (not shown) which draws out the core thread 21 from the core thread bobbin. Further, a core thread guide groove is formed in the mandrel 41a to guide the core thread 21 in a sliding manner throughout the entire length thereof.

In the winding portion 41, when the monofilament 37 is wound around the mandrel 41a in a predetermined winding condition, the monofilament 37 may be bent at the portions of the coupling head 11 and the connecting portion 14 to be molded in a coil shape, and a plurality of recesses formed in the outer peripheral surfaces of the coupling head 11 and the connecting portion 14 may be decreased in size or a part of the recess may be removed by the bending process of the monofilament 37.

Further, in this case, it is desirable to provide, for example, a first monofilament heater (not shown) in the winding portion 41 to heat the monofilament 37 when the monofilament 37 is wound around the mandrel 41a. Since the first monofilament heater is provided, the monofilament 37 may be bent in a coil shape while being heated, whereby the recess formed at the bent portion of the monofilament 37 may be more reliably decreased in size or a part of the recess may be more reliably removed.

Subsequently, the element molding portion 42 of the device includes a pair of left and right screws 42a which is disposed with the mandrel 41a of the winding portion 41 interposed therebetween and upper and lower coupling head forming portions 42b which are disposed with the mandrel 41a interposed therebetween and form the coupling head 11 in the coil-shaped monofilament 37. In the element molding portion 14, the coupling head 11 may be molded by pressing the coil-shaped monofilament 37 at a predetermined interval using the coupling head forming portion 42b while the coil-shaped monofilament 37 is carried along the mandrel 41a by the screws 42a, and the plurality of recesses formed on the surface of the pressed coupling head 11 may be further decreased in size or a larger number of recesses may be removed.

Further, in this case, it is desirable to provide, for example, a second monofilament heater (not shown) in the element molding portion 42 to heat the monofilament 37 when the coil-shaped monofilament 37 is pressed to form the coupling head 11. Since the second monofilament heater is provided, the recess formed in the outer peripheral surface of the coupling head 11 may be more reliably decreased in size or a part of the recess may be more reliably removed.

Furthermore, in the winding portion 41 or the element molding portion 42, when the average roughness Ra may be appropriately controlled within a predetermined range by appropriately setting the winding condition of the winding portion 41 or the molding condition of the element molding portion 42 without heating the monofilament 37, the monofilament heater may not be provided in the winding portion 41 or the element molding portion 42.

In this manner, the continuous fastener element 10 of the embodiment may be easily obtained by performing the element molding process 33 even using the device disclosed in Patent Document 2.

Then, when the obtained continuous fastener element 10 of the embodiment is sewn to the tape side edge of the fastener tape 22 while the core thread 21 is inserted through the upper and lower leg portions 12 and 13 thereof as described above, the pair of left and right fastener stringers 25 is formed. Further, when the slider 26 is inserted through the left and right element rows 24 of the fastener stringers 25, the slide fastener 20 having the continuous fastener element 10 of the embodiment is manufactured.

EXAMPLES

Hereinafter, the invention will be more specifically described by referring to examples, but the invention is not limited thereto at all.

Two types of continuous fastener elements 10 were manufactured by different methods in the different conditions as below, and the quality of the continuous fastener element 10 was estimated by obtaining the average values of the average roughnesses Ra of the leg portion, the coupling head 11, and the connecting portion 14 of the obtained continuous fastener element 10.

In order to manufacture the continuous fastener element 10, melted polyamide was first extruded from an extruding nozzle in the extruding process 31 to form linear monofilament, and the monofilament was stretched. In the extruding process 31, two monofilaments were manufactured at the same extruding and stretching conditions.

Subsequently, the two obtained monofilament was made to undergo the roughening process 32. In the roughening process 32, the abrasive material 39 was blasted from the blast nozzle 38 to the monofilament 37 while the monofilament 37 is carried by the device shown in FIG. 6, so that a recess was formed on the entire surface of the monofilament 37.

At this time, the abrasive material was blasted to the two monofilaments obtained in the extruding process 31 at different conditions, so that two monofilaments having different surface properties and states were manufactured. Specifically, an abrasive material WA150 of a white alundum with an average particle diameter of 70 μm was blasted from the blast nozzle 38 toward one monofilament (Example 1) at the blast pressure of 0.5 MPa, so that the surface of the monofilament was finished into a pearskin.

Further, an abrasive material WA240 of a white alundum with an average particle diameter of 57 μm was blasted from the blast nozzle 38 to the other monofilament (Example 2) at the blast pressure of 025 MPa, so that the surface of the monofilament was finished into a pearskin.

Next, the element molding process 33 was performed on each monofilament subjected to the roughening process 32 by using the device shown in FIG. 7, so that the monofilament 37 was molded by the winding portion 41 of the device in a coil shape. Furthermore, the coupling head 11 was formed in the coil-shaped monofilament 37 by the element molding portion 42 of the device.

By performing the above-described processes, two types of continuous fastener elements 10 having different average roughnesses Ra were manufactured.

Subsequently, the two types of obtained continuous fastener elements 10 were visually observed, and the average value of the average roughness Ra of each of the upper leg portion 12, the coupling head 11, and the connecting portion 14 was obtained. At this time, Talysurf S4C manufactured by Taylor Hobson, Inc. was used as a device measuring the average roughness Ra, and the average roughnesses Ra of respective portions in the direction perpendicular to the extruding direction of the monofilament were measured on the condition that the cut-off value was 0.08 mm and the measurement length was 0.4 mm. Further, the average value of the average roughnesses Ra of the upper leg portion 12, the coupling head 11, and the connecting portion 14 were obtained in a manner such that the average roughness Ra was measured three times inside the areas 12a, 11a, and 14a depicted by the imaginary lines of FIG. 1 and the average value of the measurement values of the measured average roughnesses Ra was calculated.

Here, regarding each of the continuous fastener elements 10 of Example 1 and Example 2, the calculation results of the average values of the average roughnesses Ra of the upper leg portion 12, the coupling head 11, and the connecting portion 14 and the maximum value and the minimum value of the average roughness Ra of each portion are respectively shown in Table 1 and Table 2 as below. Further, the same tables also show the results obtained by calculating the ratio of the average values of the average roughnesses Ra of the coupling head 11 and the connecting portion 14 with respect to the average value of the average roughness Ra of the leg portion.

TABLE 1

Average roughness Ra of continuous fastener element of example 1
Upper leg portion
Coupling head
Connecting portion
Average value of average roughness Ra
Maximum value of average roughness Ra
Minimum value of average roughness Ra
Ratio with respect to average roughness Ra of leg portion

TABLE 2

Average roughness Ra of continuous fastener element of example 2
Upper leg portion
Coupling head
Connecting portion
Average value of average roughness Ra
Maximum value of average roughness Ra
Minimum value of average roughness Ra
Ratio with respect to average roughness Ra of leg portion As a result of visually observing the continuous fastener elements 10 of Example 1 and Example 2, gloss and luster of the continuous fastener elements 10 were scarcely found. Further, as shown in Table 1 and Table 2, the average values of the average roughness Ra of the coupling head 11 and the connecting portion 14 of the continuous fastener elements 10 of Example 1 and Example 2 were decreased to be 90% or less, and particularly, 60% or less of the average value of the average roughness Ra of the leg portion, and were decreased to be particularly 40% or less in the embodiment. That is, it was found that the surfaces (the outer peripheral surfaces) of the coupling head 11 and the connecting portion 14 were formed to be smoother than that of the leg portion.

Therefore, since the slide fastener 20 is formed by using the continuous fastener element 10 of Example 1 or the continuous fastener element 10 of Example 2, gloss and luster of the continuous fastener element 10 is suppressed. Furthermore, the slide fastener 20 may be provided which smoothly engages or disengages the left and right element rows 24 to or from each other when the slider 26 is made to slide along the element row 24.

The invention claimed is:

1. A method of manufacturing a continuous fastener element, comprising:
    an extruding process of extruding a thermoplastic synthetic resinous material to mold linear monofilament;
    a roughening process of roughening an outer peripheral surface of the monofilament; and
    an element molding process of molding the roughened monofilament in a coil shape or a zigzag shape and pressing a part of the monofilament at a constant interval to mold a coupling head or of pressing a part of the roughened monofilament at a constant interval to mold a coupling head and molding the pressed monofilament in a coil shape or a zigzag shape,
    wherein a part of the roughened monofilament is heated and pressed when the coupling head is molded in the element molding process, so that the coupling head is molded and an average roughness of an outer peripheral surface of the coupling head is made smaller than an average roughness of outer peripheral surfaces of upper and lower leg portions which extend from the coupling head in a width direction.

2. The method of manufacturing a continuous fastener element according to claim 1,
wherein in the element molding process, the roughened monofilament is heated and molded in the coil shape or the zigzag shape.

3. The method of manufacturing a continuous fastener element according to claim 1,
wherein in the roughening process, an abrasive material is blasted from a blast nozzle toward the monofilament to roughen the outer peripheral surface of the monofilament.

4. The method of manufacturing a continuous fastener element according to claim 1,
wherein in the roughening process, the monofilament is guided between a plurality of polishing rollers and is made to come into slide-contact with polishing surfaces of the polishing rollers to roughen the outer peripheral surface of the monofilament.

5. The method of manufacturing a continuous fastener element according to claim 1,
wherein the average roughness of the outer peripheral surface of the coupling head is 90% or less of the average roughness of the outer peripheral surfaces of the upper and lower leg portions.

6. The method of manufacturing a continuous fastener element according to claim 1,
wherein the outer peripheral surfaces of the leg portions are each formed to have the average roughness 0.1 μm or more and 100 μm or less.

* * * * *

UNITED STATES PATENT AND TRADEMARK OFFICE
CERTIFICATE OF CORRECTION

PATENT NO. : 9,227,370 B2  
APPLICATION NO. : 14/134068  
DATED : January 5, 2016  
INVENTOR(S) : Satoshi Matsumoto et al.

Page 1 of 1

It is certified that error appears in the above-identified patent and that said Letters Patent is hereby corrected as shown below:

Title page,

Item (75), in column 1, in "Inventor", line 1, delete "Tapei" and insert -- Taipei --, therefor.

Item (75), in column 1, in "Inventor", line 2, delete "Tapei" and insert -- Taipei --, therefor.

In the Drawings,

On sheet 3 of 5, in Figure 4, Reference Numeral 32, line 1, delete "ROUGHNING" and insert -- ROUGHENING --, therefor.

In the Specification,

In column 7, line 47, delete "line" and insert -- line III-III --, therefor.

In column 10, line 24, delete "20" and insert -- 20 μm, --, therefor.

Signed and Sealed this  
Nineteenth Day of April, 2016

Michelle K. Lee  
*Director of the United States Patent and Trademark Office*